March 28, 1944.  R. P. HANNA  2,345,118
TROLLEY FROG
Filed Jan. 28, 1942
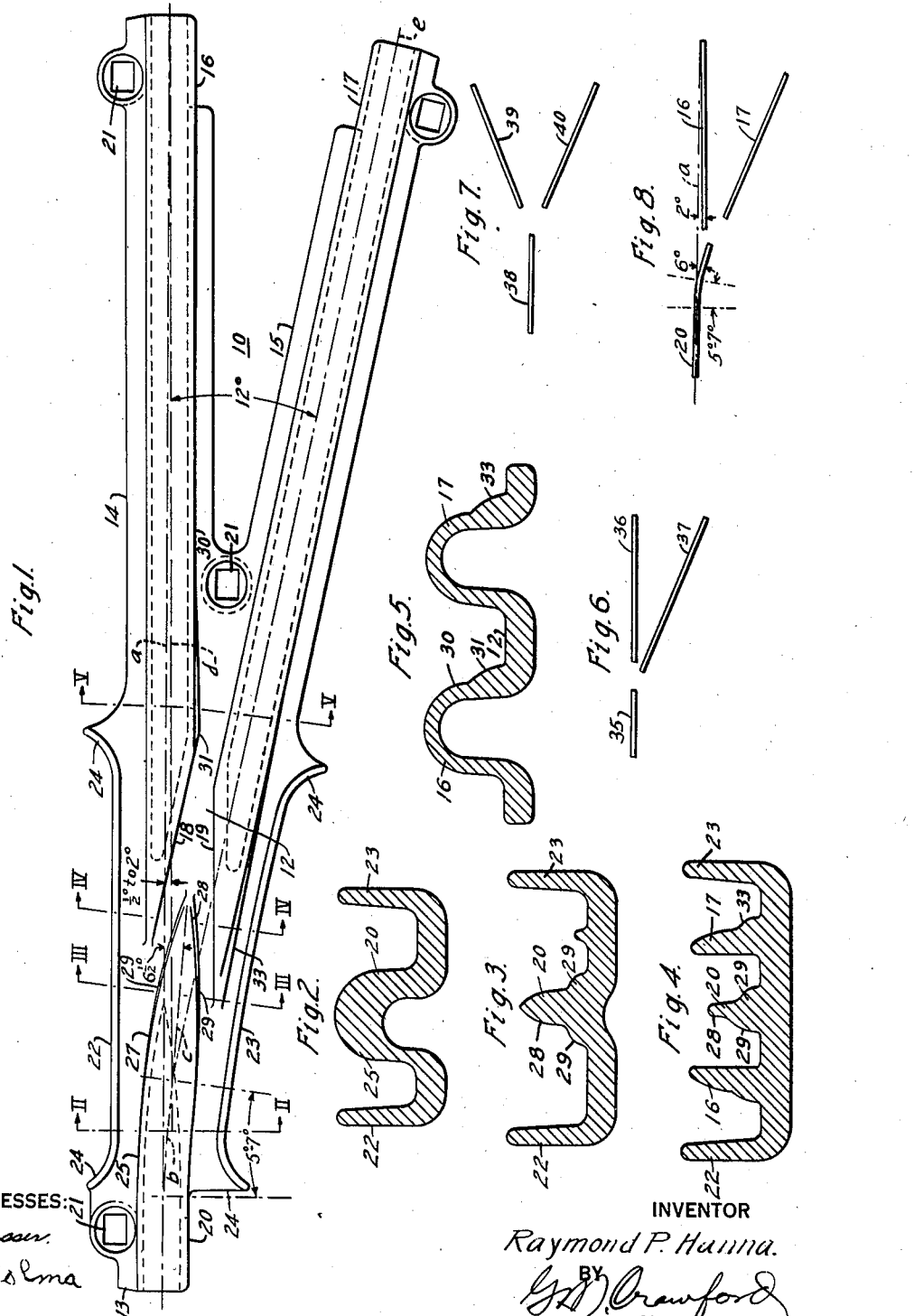
INVENTOR
Raymond P. Hanna.
BY
ATTORNEY Patented Mar. 28, 1944

2,345,118

UNITED STATES PATENT OFFICE 2,345,118

TROLLEY FROG

Raymond P. Hanna, Pittsburgh, Pa., assignor to Westinghouse Electric & Manufacturing Company, East Pittsburgh, Pa., a corporation of Pennsylvania Application January 28, 1942, Serial No. 428,515

3 Claims. (Cl. 191—38)

My invention relates, generally, to trolley frogs, and has reference in particular to trolley frog pans for use in overhead current collector systems.

Generally stated, it is an object of my invention to provide a trolley frog pan which is simple and inexpensive to manufacture, and which is durable and reliable.

More specifically, it is an object of my invention to provide a trolley frog pan wherein the common portion of the main runner member is deflected toward the branch runner member, and the adjoining portion of the main runner member is inclined toward the branch runner member to facilitate travel of a current collector between the branch and main runner members.

It is also an object of my invention to so arrange the runner members in a trolley frog pan as to prevent gouging of the common portion of the main runner member by a current collector travelling from the branch to the main runner member.

Another object of the invention is to provide for more smoothly guiding a current collector along the desired path so as to secure improved operation of a current collector over the trolley frog pan.

A further object of the invention is to provide a trolley frog structure wherein spaced sections of a main runner member are deflected towards a branch runner member so as to secure smoother travel of a current collector between the main and branch runner members.

Still another object of the invention is to provide for gradually deflecting a current collector traversing the frog pan into its final path of travel by extending the base portions of the sides of the runner members adjacent the intersection in the direction the current collector is to travel, so that the extended side portions deflect the current collector into the desired path.

Other objects will, in part, be obvious, and will, in part, appear hereinafter.

In accordance with one embodiment of my invention, the frog pan, having a main arm and an intersecting branch arm angularly related thereto, has a branch runner member on the branch arm and a main runner member on the main arm, inclined slightly toward the branch arm member at the inner end thereof. A common runner member is provided on the main arm in spaced longitudinal relation to the main and branch runner members, having the end remote from the main runner member aligned generally with the main arm. The end adjacent the main runner member is inclined toward the branch runner member at an angle intermediate the angles between the main runner member and longitudinal axis of the main arm, and between it and the branch runner member. The end portions of the common runner member are joined by an intermediate portion so curved that the end portions are tangent thereto. The side of the main and branch runner members are provided with projecting base portions on the sides towards the branch runner member and both sides of the common runner member are similarly shaped adjacent the intersection.

For a more complete understanding of the nature and scope of my invention, reference may be had to the accompanying drawing, in which:

Figure 1 is a bottom plan view of a trolley frog pan embodying the principal features of the invention;

Fig. 2 is an enlarged sectional view taken along the line II—II of Fig. 1;

Fig. 3 is an enlarged sectional view taken along the line III—III of Fig. 1;

Fig. 4 is an enlarged sectional view taken along the line IV—IV of Fig. 1;

Fig. 5 is an enlarged sectional view taken along the line V—V of Fig. 1;

Fig. 6 is a diagrammatic view illustrating an arrangement of the runner members in one form of trolley frog pan of the prior art;

Fig. 7 is a diagrammatic view illustrating an arrangement of the runner members on a modified form of trolley frog pan of the prior art; and Fig. 8 is a diagrammatic view illustrating an arrangement of the runner members on a trolley frog pan embodying the present invention.

Referring to Fig. 1, the reference numeral 10 may denote generally a trolley frog pan which may be used with a trolley frog back plate or the like (not shown) securing it in predetermined relation to main and intersecting branch conductors (not shown) for providing a smooth path therebetween. The pan 10 may comprise generally a central relatively flat plate portion 12 having substantially aligned projecting main arms 13 and 14, which may be positioned in alignment with the main trolley conductor, and an angularly related intersection arm 15, which may be aligned with the intersecting branch conductor. The arm 14 may be provided with an elongated runner member 16, and the arm 15 may be provided with a branch runner member 17. Both of these runner members may extend onto the plate portion 12 of the pan and may be provided with inclined end portions 18 and 19, respectively, at their inner ends. The arm portion 13 may be provided with a runner member 20 positioned in spaced longitudinal relation to the runner members 16 and 17 and common to both of them. Openings 21 may be provided in the plate 12 and adjacent the ends of the arms to receive means for securing the pan to a back plate or the like. Depending sides 22 and 23 may be provided on opposite sides of the plate 12, having end portions 24 curved outwardly away from the runner members, to engage the sides of a current collector and assist in guiding it through the intersection.

The runner members 16 and 20 may cooperate to provide a substantially straight through runner for guiding a current collector which is travelling along the main trolley conductor with which the pan is used. The dot-dash line $a$ may denote generally the longitudinal axis of the main conductor with which the pan is used. Instead of having the common runner member 20 substantially in alignment with the longitudinal axis $a$ of the main conductor, I prefer to deflect the common runner member towards the branch runner member 17. For example, while the extreme end portion of the common runner member 20 may be substantially in alignment with the longitudinal axis $a$ of the main conductor, the intermediate portion 25 thereof may be curved for a predetermined length in the direction of the branch runner member, as indicated by the dash line $b$ which denotes the center line of the common runner member. The curved portion of the center line $b$ between the two radii in Fig. 1, indicates generally the extent of this curved portion. The end portion 27 of the common runner member adjacent the intersection may be substantially straight as indicated by the relatively straight portion $c$ of the dash center line thereof.

In order to provide for smooth travel of a current collector from the common runner member 20 onto either the main or branch runner members, or vice versa, the end portion 27 of the common runner member may be provided with tapered sides 28 as is best shown in Figs. 3 and 4. To assist in guiding a current collector traversing the pan as smoothly as possible, projecting side portions 29 may be provided along both sides of the end portion 27 adjacent the plate 12 of the pan. These projecting side portions 29 may be so positioned that they engage the upper edges of the lip portions of a current collector traversing the pan and deflect the current collector more smoothly into the desired path before the current collector directly strikes the sides 28 of the end portion proper.

In order to secure smoother travel of the current collector between the common runner member 20 and the main runner member 16, the main runner member 16 may be inclined slightly toward the branch runner member 17 adjacent the plate 12. The dash-dash line $d$, which indicates the center line or longitudinal axis of the main runner member 16 illustrates clearly this inclination or deflection by its deviation from the longitudinal axis $a$ of the main conductor.

In order to provide for further effecting smooth travel of a current collector from the main runner member 16 to the common runner member 20, the side 30 of the main runner member adjacent the branch runner member may be provided with a projecting or extending portion 31 adjacent the plate 12 which is shaped to gradually engage the upper lip portion of a current collector traversing the main runner member and deflect it gradually toward the branch runner member.

The branch runner member 17 also may be provided with a projecting or extending side portion 33 adjacent the plate 12 at the end adjacent the common runner member 20. This projection may be so shaped as to engage the upper lip portion of the current collector traversing the branch runner member 17 and gradually deflect the current collector into the path of the common runner member 20 so as to insure a smooth transfer therebetween. The longitudinal axis or center line of the branch runner member may be denoted by the dot-dash line $e$.

From Fig. 1, it will be apparent that the common runner member 20 is so curved that the center line $e$ of the branch runner member 17 intersects the center line $d$ of the main runner member 16 on the curved portion $b$ of the center line of the common runner member. The center line of the branch runner member and the longitudinal axis of the main conductor intersect on the convex side of the curved portion of the common runner member. These relations have been found important in securing improved operation of current collectors over the trolley frog pan.

Referring to the diagrammatic sketches of Figs. 6, 7 and 8, it will be seen that in the prior art the transfer of a current collector between main and branch conductors involved either a sudden deflection from the straight path provided by the common runner member 35 and the main runner member 36 to the angularly related runner member 37 as shown in Fig. 6, or a substantially sudden deflection from the straight path provided by the common runner member 38 of Fig. 7 to either of the angularly related runner members 39 or 40.

From Fig. 8 it will be apparent that by my invention I have provided a simple and effective manner for effecting a relatively smooth transfer between a substantially straight path defined by the common and main runner members 20 and 16, respectively, and an angularly related path defined by the branch runner member 17. The included angle between the branch runner member 17 and the longitudinal axis $a$ of the main conductor may be substantially equal to the intersecting angle between the main and branch conductors with which the trolley frog pan is to be used, and may, for example, be approximately 12 degrees, as shown. The common runner member 20 may, for example, be provided with an intermediate curve portion extending through an angle of approximately 6 to 7 degrees in a 12 degree pan, so that the relatively straight end portion thereof adjacent the main runner member 16 is deflected toward the branch runner member 17, thus assisting in effecting a smooth transfer of a current collector between the common and branch runner members. In fact, by providing such an intermediate curve portion, the common runner member 20 may be utilized to deflect a current collector onto the branch runner member without requiring any external biasing force to be applied to the current collector to force it along this path, thus providing what is known as a "taking" frog pan. By inclining the main runner member 16 slightly toward the branch runner member 17 adjacent the inner ends, transfer of a current collector from the main to the common runner member is greatly facilitated. I have found that an inclination of about ½ to 2 degrees secures good results in a 12 degree frog pan.

In view of the foregoing, it will be apparent that I have provided, in a simple and effective manner, for improving the operating characteristics of trolley frog pans so that transfer of current collectors between the branch and main runner members is greatly facilitated, and faulty operations of the current collector on the frog pan are almost entirely eliminated.

Since certain changes may be made in the above description, and different embodiments of the invention may be made without departing from the spirit thereof, it is intended that all the matter contained in the above description or shown in the accompanying drawing shall be considered as illustrative and not in a limiting sense.

I claim as my invention:

1. The combination in a trolley frog having main and branch runner members inclined at a major angle, of a main runner portion inclined to the branch runner member at an angle less than the major angle substantially coextensive with the branch runner member and having additional material along the base thereof adjacent the end on the side nearer the branch runner member, and an additional main runner portion common to the branch runner member and said main runner portion having an end portion inclined toward the branch runner member.

2. A trolley frog having main and branch runners intersecting at a major angle comprising, a main member substantially coextensive with the branch runner member and inclined slightly toward the branch runner member from the line of the main runner adjacent the intersection, and a runner member common to and positioned in spaced longitudinal relation to the main and branch runner members and having the end adjacent thereto inclined toward the branch runner member at an angle less than the major angle, said main and branch runner members having projections along the corresponding sides thereof adjacent the intersection to deflect a current collector toward the side on which the branch runner member is positioned.

3. The combination in a trolley frog, of a pair of angularly related arms, a branch runner member on one of the arms having a projecting side portion adjacent the base along the side remote from the other arm, a main runner member on the other arm substantially coextensive with the branch runner member having a projecting side portion adjacent the base along the side toward the branch runner member, and an additional runner member on said other arm common to said main and branch runner members positioned in spaced longitudinal relation thereto and provided with an intermediate portion curved toward the branch runner member through an angle less than the angle between the main and branch runner members.

RAYMOND P. HANNA.